May 21, 1957

P. R. CHRISTIANS

MEANS TO FACILITATE REPAIRS TO TELEVISION AND RADIO RECEIVING SETS 2,793,091

Filed July 2, 1954

3 Sheets-Sheet 1

Inventor
Perce R. Christians
by Talbert, Dick & Adler
Attorneys

Witness
[signature]

May 21, 1957 P. R. CHRISTIANS 2,793,091

MEANS TO FACILITATE REPAIRS TO TELEVISION AND RADIO RECEIVING SETS

Filed July 2, 1954

3 Sheets-Sheet 2

Inventor
Perce R. Christians
by Talbert Dick & Adler
Attorneys

Witness
Edward P. Seeley

May 21, 1957
P. R. CHRISTIANS
2,793,091
MEANS TO FACILITATE REPAIRS TO TELEVISION AND RADIO RECEIVING SETS
Filed July 2, 1954
3 Sheets-Sheet 3

Inventor
Perce R. Christians
by Talbert Dick & Adler
Attorneys

Witness
Edward P. Seeley

United States Patent Office 2,793,091

Patented May 21, 1957

2,793,091

MEANS TO FACILITATE REPAIRS TO TELEVISION AND RADIO RECEIVING SETS

Perce R. Christians, Sioux City, Iowa

Application July 2, 1954, Serial No. 441,011

2 Claims. (Cl. 312—7)

Figures 1, 2, 3, 4:
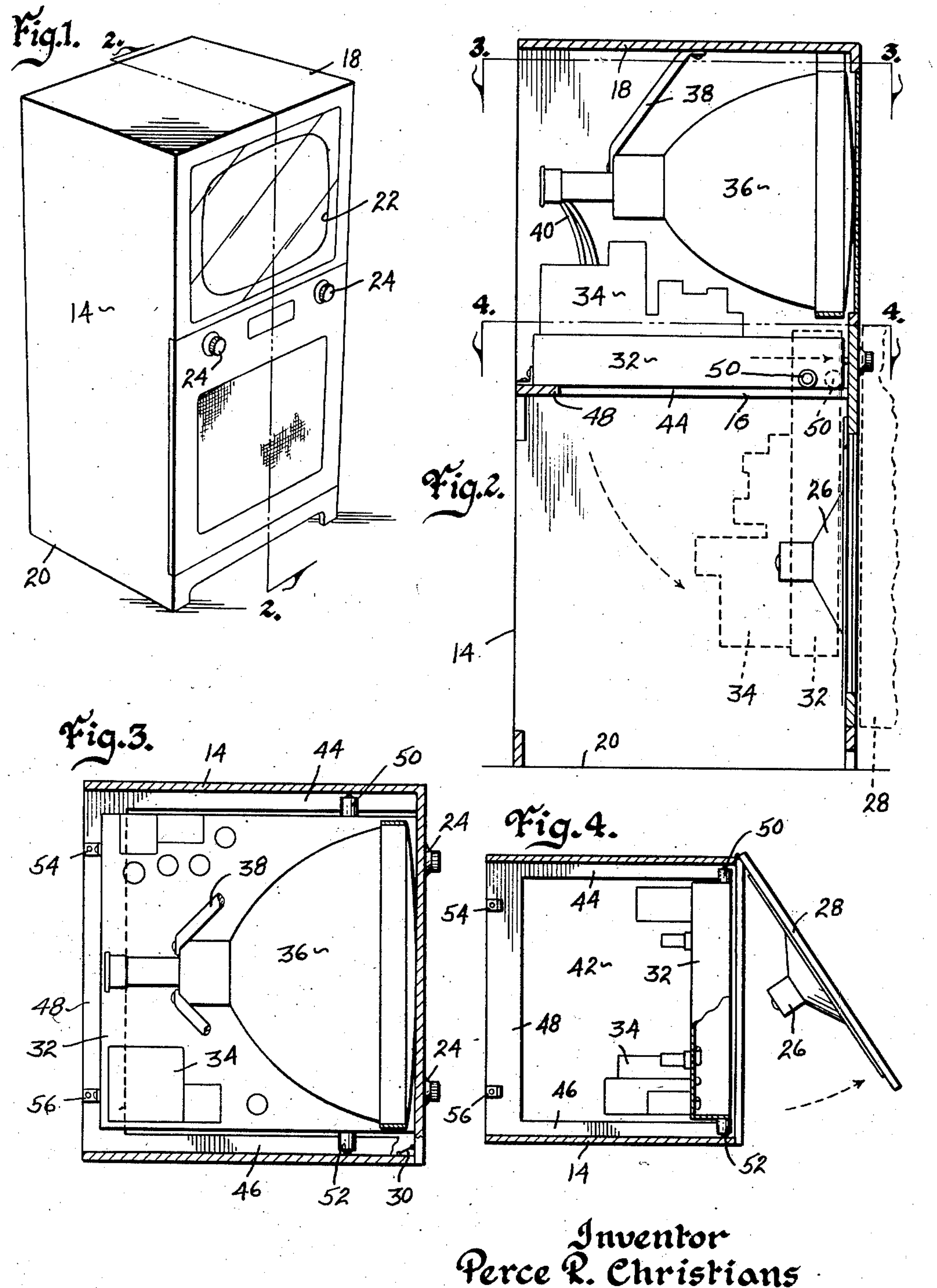

My invention relates to certain novel means for mounting the chassis of a television receiver, or radio and phonograph set or a combination of the three in its outer cabinet so that repairs thereto can be made quickly and without completely removing the chassis.

The problems involved, as I will point out, are probably best illustrated by a television receiver, so I have adopted that form in my drawings, but it should be clearly understood that such illustrations should in no way be construed as limiting the use of my invention as it may be employed wherever electronic or electrical apparatus is used as to present the problem involved.

In a television receiving set, for example, the many component parts are assembled and mounted on what is known as a chassis. This is nothing more than a suitable platform base, usually of metal, and suitably contains the various parts and equipment making up the set so that the chassis may be inserted into and removed from the outer cabinet as a unit. In some sets, the kinescope, or picture tube, as it is commonly known, may be mounted to the inner side of the cabinet rather than on the chassis but this requires but a slight variation in my invention as will later appear. The various pieces of equipment or apparatus making up the set are mounted to the top side of the chassis and are appropriately interconnected to a rather complex wiring system located for all practical purposes at the under or bottom side of the chassis. Consequenly, when repairs or testing is necessary, it is apparent that the chassis must be removed from the cabinet in order to get access to the underside thereof and because of the many different shaped pieces of equipment mounted thereon, the chassis does not easily lend itself to being inverted without the possibility of damaging some of the parts unless special means are available for supporting the chassis. Such means are generally found at regular repair shops but are not adapted for carrying on service calls, with the result that many sets that might have been serviced at the site are returned to the shop. This necessarily increases repair charges since one trip is required to obtain the chassis and bring it to the shop and another trip is required to return and install it and in addition the time involved in the extra trip could be better utilized in servicing more equipment for a greater number of people.

With these observations in mind it is one of the important objects of my invention to provide means for assembling the chassis carrying equipment for television and radio sets and the like to the outer cabinet by which the chassis can be pivoted about a support point to expose the underside thereof for easy access in making repairs.

More particularly in regard to a television chassis having the picture tube mounted thereon, I provide alternate ways to expose the underside of the chassis at either the front or rear of the cabinet in suspended position and when the exposure is to the front, a door is provided on the cabinet to open outwardly.

With regard to a television set where the picture tube is mounted to the inner side of the cabinet, it is an object of this invention to provide a pivoting arrangement whereby the underside of the chassis is exposed toward the front of the cabinet and here also a door in the front of the cabinet is provided which when opened affords access to repair the chassis. This latter arrangement is particularly advantageous since the repairs are made from the front of the set where the picture tube can be seen and consequently one person can adjust the controls and observe the results on the screen whereas heretofore in adjusting the picture tube, either a second person was required to view the screen as controls were manipulated by the other, or a mirror was necessary, or the one person had to make repeated trips back and forth between the front and rear of the screen. This same advantage is present when the chassis having the tube mounted thereon is manipulated so the underside is exposed to the front since the screen is visible from the front through the usual cabinet opening in which it is normally positioned.

These and other objects will be apparent to those skilled in the art.

Figure 5:
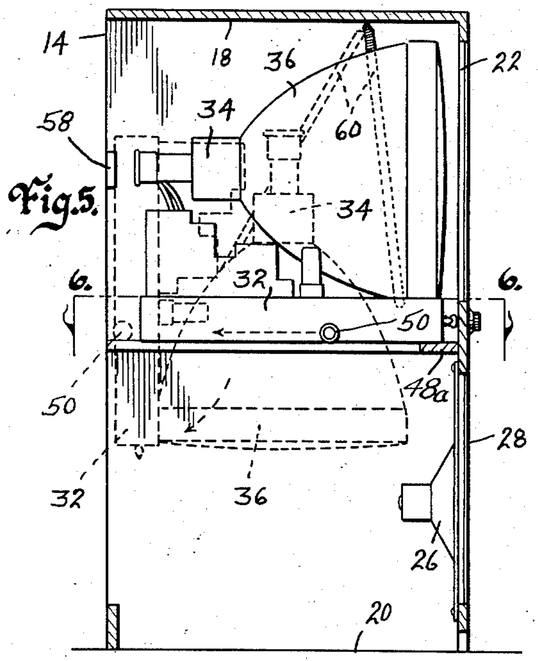
Figure 6:
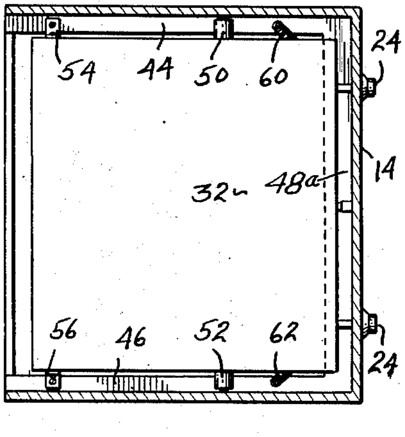
Figures 7, 8:
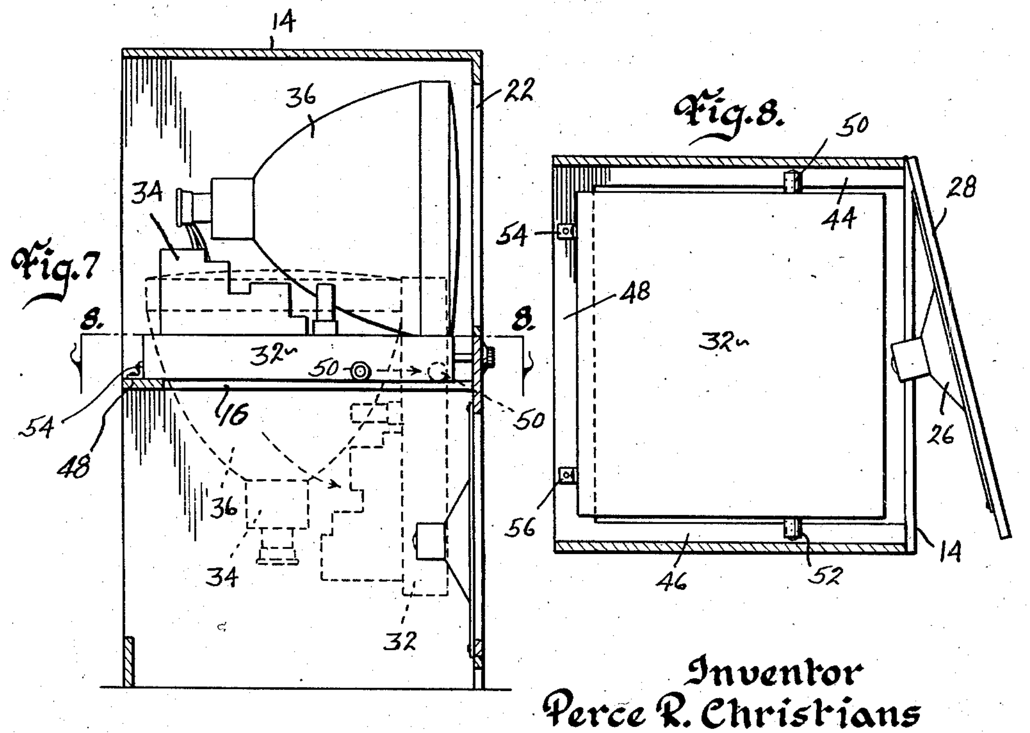
Figures 9, 10:
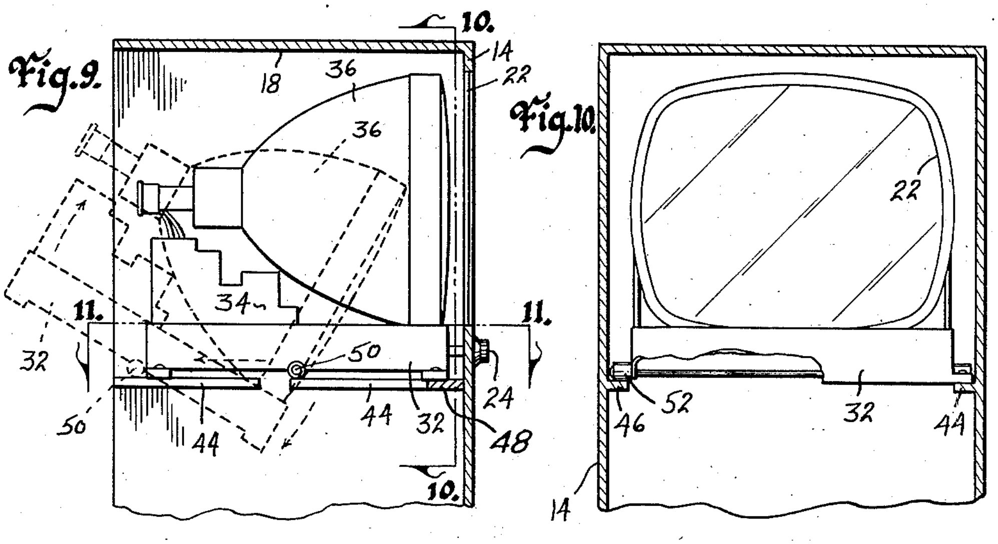
Figure 11:
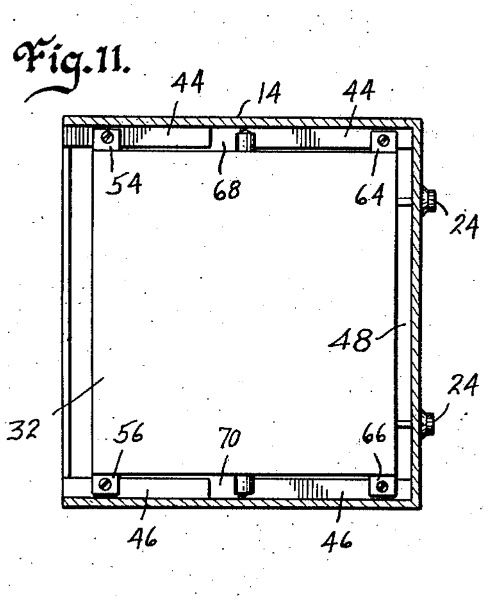
Figure 12:
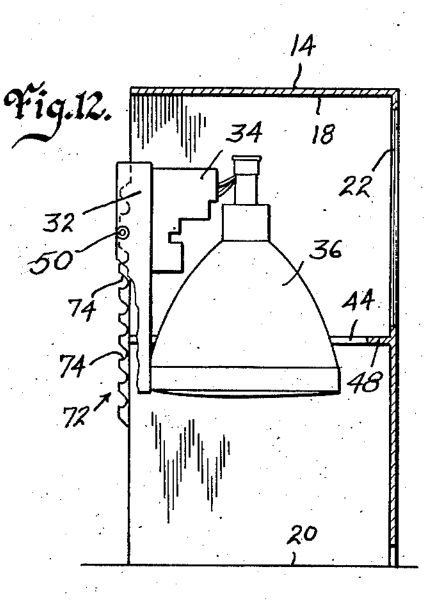

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a perpective view of a floor model or console type television cabinet to which a preferred embodiment of my invention is applied, Fig. 2 is an enlarged cross sectional view taken on the line 2—2 of Fig. 1 to illustrate in solid lines the operable position of a chassis with picture tube mounted to the cabinet and in broken lines the chassis when moved for exposing the underside thereof to the front of the cabinet, Fig. 3 is a top view taken from the line 3—3 of Fig 2 to show a plan arrangement of the chassis in operable position, Fig. 4 is a top view from the line 4—4 of Fig. 2 showing the chassis when moved for repairs and also showing the door at the front of the cabinet in open position, Fig. 5 is a longitudinal sectional view of the cabinet showing a chassis and picture tube mounted thereon in solid lines, with the broken lines indicating the moved position of the chassis for exposing its underside to the rear of the cabinet, Fig. 6 is a plan view of the lower portion of the chassis with the cabinet in section taken on the line 6—6 of Fig. 5, Fig. 7 is a longitudinal sectional view of the cabinet showing the picture tube mounted to the chassis and illustrates exposing the underside of the chassis to the front of the cabinet, Fig. 8 is a plan view of the lower part of the chassis with the cabinet in section taken on the line 8—8 of Fig. 7 and shows the door on the cabinet in open position, Fig. 9 is similar to Fig. 5 and shows a modification in structure for accomplishing the desired change in position for the chassis, Fig. 10 is a cross sectional view taken on the line 10—10 of Fig. 9, Fig. 11 is a plan view from line 11—11 of Fig. 9 with the cabinet in section to more fully show the modified structure therein, and Fig. 12 is a side view partially in section showing a chassis with its underside exposed to the rear of the cabinet and illustrating means for adjustably suspending the chassis at different heights relative to the bottom of the cabinet.

Referring to the drawings the cabinet 14 is a well known style being usually called a floor or console model and is provided with the interior shelf 16 approximately midway between the top 18 and bottom 20 to support certain mechanism as will later be pointed out in more detail. The picture tube frame opening 22 is at the upper front as shown in Fig. 1 and certain smaller openings in the cabinet 14 are provided in various positions to receive the variable controls 24. Behind the lower portion of the front of the cabinet is usually mounted the speaker 26 and for certain variations of my invention I have made this lower portion into a door means 28 which opens outwardly and which is provided with a suitable catch, hook or lock means 30 on the inner side (Fig. 3) to prevent its being accidentally opened such as by children. Except for my door 28 and latch 30, the cabinet illustrated is representative of such cabinets in general as no invention is claimed therefore per se.

Shelf 16 is designed to support the chassis 32 on which is such apparatus as tubes, resistors, rectifiers, condensers and the like designated generally by the numeral 34 and in some models the picture tube 36 will be mounted to the chassis 32 as shown in Figs. 5, 7, 9 and 11. In other models the picture tube 36 will be affixed to the cabinet 14 by means of suitable braces 38 as illustrated in Figs. 2 and 3 and connected to the requisite equipment on the chassis by the wires 40. At the underside of the chassis 32 will be found a maze of wiring (not shown) forming the rather complex circuits to which the equipment 34 and 36 is suitably connected and it for the purpose of affording easy access to this wiring beneath the chassis that my invention has utility.

The operable positions of the chassis and picture tube are shown in solid lines in the respective drawings so that the difficulty in trying to service the wiring in the chassis while the same remains in the cabinet is quite obvious. The chassis, however, can be removed entirely from the cabinet with very little difficulty by loosening certain fastening screws or brackets in present models but once removed, the problem is what to do with it if repairs are to be attemped at the site. Especially is this problem apparent in private homes where it is not feasible to place the chassis on the floor lest it be damaged or some damage occur to rugs or furniture. With this specific problem more particularly in mind I have therefore adapted the chassis to be tilted about a pivot point using shelf 16 for a support so that the underside can be exposed at either the front or rear of the cabinet as I shall now describe.

Referring now to Figs. 2, 3 and 4, I have shown a model of a television set where the picture tube 36 is mounted to the inner side of the cabinet 14 by means of suitable brackets or braces 38 and operatively connected by wires 40 to the equipment 34 on chassis 32. For this arrangement shelf 16 which it will be understood is suitably secured in place in the cabinet 14 has its major portion cut away to form the central opening 42, side ledges 44 and 46 and rear ledge 48 (Fig. 4) and it will be observed in Fig. 3 that opening 42 is somewhat wider and longer than the comparable dimensions of the chassis. Chassis 32 is provided at each side near its forward end relative to the front of cabinet 14 with projecting roller bearing members 50 and 52 that are supported by and move on the respective ledges 44 and 46. Brackets 54 and 56 in spaced relation on rear ledge 48 are adapted for attachment by screws or the like to the rear of chassis 32 for releasably securing the chassis on shelf 16 against accidental movement when the set is in use or being transported. When thus secured, bearings 50 and 52 will be spaced inwardly from the inner side of the front of the cabinet 14 as shown in Figs. 2 and 3. To move the chassis 32 to the dotted line position of Fig. 2, brackets 54 and 56 are released therefrom, door 28 is opened outwardly (Fig. 4) by releasing catch 30 from the inside to allow clearance for the variable controls 24 for which the knobs are of course removed and when this is done, the chassis can be moved forwardly sufficiently to clear ledge 48 whereby the entire chassis will pivot downwardly on bearings 50 and 52 to be suspended with the underside exposed to the front of the cabinet in the opening provided by door 28. From this arrangement it will be apparent that a repair man has easy access to all the wiring at the underside of the chassis and since this access is from the front side of the cabinet he can observe the effect on the picture tube of any adjustments required thereon without additional help and without changing his position. For returning the chassis to its solid line position, the procedure described is merely reversed. It might be added that the reason for latch 30 within the cabinet is for safety measures so that children especially cannot open door 28 and come in contact with the high voltage circuits. It should also be mentioned that wires 40 usually have sufficient slack to permit the movement of the chassis as described and in any instance where this may not be the case, longer wires can be easily installed. The chassis of Figs. 2–4 may also be adapted for tilting so that the underside will be exposed to the rear of the cabinet in same manner as illustrated in Figs. 5 and 6 which I shall now describe. This requires but a slight relocation of brackets 54 and 56 and bearings 50 and 52 and does not require the door 28 as will be apparent.

In Figs. 5 and 6 and also in the rest of the drawings I have illustrated the type of set where the picture tube 36 is mounted to and movable with the chassis 32 as distinguished from Figs. 2–4 where it is separately attached to the cabinet. The principle of operation of my invention is similar for all illustrations, however, and like parts have been given like numbers. Figs. 5 and 6 show the chassis tilted to expose the underside to the rear of the cabinet 14. This requires moving bearings 50 and 52 slightly rearwardly on the chassis 32 to change the center of gravity and brackets 54 and 56 are mounted at the rear of ledges 44 and 46 with ledge 48*a* being at the front. Opening 42 is substantially the same and chassis 32 is tilted by loosening brackets 54 and 56 to allow a pivotal movement on bearings 50 and 52 in which the forward portion of the chassis swings downwardly through opening 42. As this occurs, brackets 54 and 56 respectively will engage stops affixed to the inner sides of the cabinet above shelf 16 as indicated in Fig. 5 by the numeral 58 so that the chassis will not pivot past a substantially vertical plane. Such arrangement, of course, does not require the presence or use of the door 28. Since chassis 32 will carry a substantial weight I suggest the use of a pair of springs 60 and 62 (Figs. 5 and 6) secured at one end at opposite points to the underside of the top of cabinet 14 and at their other respective ends to opposite sides of the forward portion of the chassis 32. These springs will thus provide a yielding stop or check means to keep the chassis from a sudden drop and will serve to eliminate damage to the parts 34 and 36 from sudden motion or jarring.

In Figs. 7 and 8 I show the arrangement of Fig. 5 adapted for swinging so the underside of the chassis is exposed to the front of the cabinet with door 28 being utilized as described for Fig. 2. In this arrangement braces 54 and 56 are returned to the rear ledge 48 and bearings 50 and 52 are relocated to provide the necessary center of gravity.

In Figs. 9, 10 and 11 I have illustrated a modified arrangement of shelf 16 and supports for the chassis to accomplish the movement to the rear of the cabinet shown in Fig. 5. Here brackets 54 and 56 are at the rear sides of the chassis for attachment to the rear of ledges 44 and 46 and similar brackets 64 and 66 are at the front sides of the chassis for attachment respectively to the front of ledges 44 and 46. Each ledge 44 and 46 is formed in two sections, which are respectively spaced apart endwise to form the respective passageways 68 and 70 (Fig.

11) located approximately midway between the front and rear of the cabinet. Bearing members 50 and 52 are also located on the chassis approximately midway from front to rear and when the chassis is in operable position, it is supported by brackets 54, 56, 64 and 66 on shelf 16 so that rollers 50 and 52 are spaced above the shelf. To move the chassis in this arrangement according to my invention, the several brackets are released and the chassis is moved rearwardly until brackets 64 and 66 drop through passageways 68 and 70. As this occurs, bearings 50 and 52 will come to rest on shelf 16 and serve as a pivot point for the chassis to swing as shown by the dotted lines in Fig. 9.

Fig. 12 illustrates the use of an elongated vertically disposed bracket 72 having a plurality of vertically spaced notches 74 located on the rear edge of the cabinet at each side. These brackets 72 may be employed in any of the arrangements where the chassis is tilted to the rear and brackets 54 and 56 are on ledges 44 and 46 or at the side of the chassis as described. Their purpose is to afford means for engaging rollers 50 and 52 in different of the notches 74 to selectively vary the height at which the chassis is suspended while it is being worked on.

With reference again to Fig. 7 I would like to point out that the dotted line position of the picture tube 30 is such that it can be observed through the cabinet opening 22 while the chassis is being worked on from the front of the cabinet and while it is not quite as convenient as the arrangement in Fig. 2 it is a substantial improvement over present methods. In Figs. 5, 9 and 12 where the tube 36 is moved as shown while the chassis is being serviced from the rear of the cabinet, it is possible to place a mirror at the bottom of the cabinet and below the tube to observe the effects of any adjustments being made.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my means to facilitate repairs to television and radio receiving sets without departing from the real spirit and purpose of my invention, and it is my intention to cover by my claims, any modified forms of structure or use of mechanical equivalents which may be reasonably included within their scope.

I claim:

1. In combination, a cabinet for television and radio receiving sets and the like, having a front and rear side, a shelf in said cabinet, a chassis adapted for containing equipment and apparatus pertinent to the operation of said television or radio set, said shelf provided with an opening longer and wider than the respective length and width of said chassis and formed so as to provide a rear ledge and two spaced side ledges relative to the front and rear sides of said cabinet, bearing members oppositely disposed at the forward portion of the sides of said chassis relative to the front of said cabinet and movable on and supported by said shelf, means releasably attaching the rearward portion of said chassis to said rear ledge, and said chassis when said means are released tiltable on said bearing members as a pivot point so that the rearward end of said chassis passes through said opening whereby the underside of said chassis is disposed in a vertical plane, and a door member on the front of said cabinet openable to the front to afford easy access to the underside of the chassis for purposes of inspection, testing and repairs of apparatus associated therewith.

2. A device as defined in claim 1 characterized by a lock means on said door located at and releasable only from the inside of said cabinet.

References Cited in the file of this patent

UNITED STATES PATENTS

| | | |
|---|---|---|
| 243,958 | Osborne | July 5, 1881 |
| 2,337,159 | Friedel | Dec. 21, 1943 |
| 2,486,764 | Singer | Nov. 1, 1949 |
| 2,510,681 | Campbell | June 6, 1950 |
| 2,630,364 | Gleason | Mar. 3, 1953 |
| 2,655,422 | Gussack | Oct. 13, 1953 |